(12) United States Patent
Reddy et al.

(10) Patent No.: US 8,877,691 B2
(45) Date of Patent: Nov. 4, 2014

(54) METHODS AND COMPOSITIONS FOR ALTERING THE VISCOSITY OF TREATMENT FLUIDS USED IN SUBTERRANEAN OPERATIONS

(75) Inventors: B. Raghava Reddy, Duncan, OK (US); Narongsak Tonmukayakul, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 422 days.

(21) Appl. No.: 13/343,358

(22) Filed: Jan. 4, 2012

(65) Prior Publication Data

US 2012/0111564 A1    May 10, 2012

Related U.S. Application Data

(62) Division of application No. 12/009,027, filed on Jan. 16, 2008, now Pat. No. 8,114,818.

(51) Int. Cl.

| C09K 8/68 | (2006.01) |
|---|---|
| C09K 8/86 | (2006.01) |
| C09K 8/035 | (2006.01) |
| C09K 8/502 | (2006.01) |
| C09K 8/506 | (2006.01) |
| C09K 8/508 | (2006.01) |
| C09K 8/64 | (2006.01) |
| C09K 8/82 | (2006.01) |
| C09K 8/88 | (2006.01) |

(52) U.S. Cl.
CPC . *C09K 8/86* (2013.01); *C09K 8/035* (2013.01); *C09K 8/502* (2013.01); *C09K 8/506* (2013.01); *C09K 8/5083* (2013.01); *C09K 8/64* (2013.01); *C09K 8/68* (2013.01); *C09K 8/82* (2013.01); *C09K 8/882* (2013.01); C09K 2208/30 (2013.01)
USPC ........................................ 507/203; 166/305.1

(58) Field of Classification Search
None
See application file for complete search history.

(56) References Cited

U.S. PATENT DOCUMENTS

| 6,787,038 B2 * | 9/2004 | Brusseau et al. ............... 210/634 |
| 2006/0283592 A1 * | 12/2006 | Sierra et al. ................... 166/281 |

\* cited by examiner

*Primary Examiner* — Alicia Bland
(74) *Attorney, Agent, or Firm* — McDermott Will & Emery LLP; Craig W. Roddy

(57) ABSTRACT

Methods of decreasing the viscosity of a treatment fluid through contact with a cyclodextrin modifier. Such methods include providing a cyclodextrin modifier; providing a treatment fluid that comprises a base fluid and a viscosifying agent wherein the viscosifying agent is selected from the group consisting of a hydrophobically modified polymer, a viscoelastic surfactant, a phosphonate surfactant, or a combination thereof; and, introducing the cyclodextrin modifier and the treatment fluid into a well bore penetrating a subterranean formation wherein the viscosity of the treatment fluid is decreased due to the combination of the hydrophobically modified polymer and the cyclodextrin modifier.

10 Claims, 3 Drawing Sheets

METHODS AND COMPOSITIONS FOR ALTERING THE VISCOSITY OF TREATMENT FLUIDS USED IN SUBTERRANEAN OPERATIONS

CROSS REFERENCE TO RELATED APPLICATIONS

This application is a divisional of U.S. patent application Ser. No. 12/009,027 filed on Jan. 16, 2008, entitled "Methods and Compositions for Altering the Viscosity of Treatment Fluids Used in Subterranean Operations," and published as US 2009/0181866 by B. Raghava Reddy, et al.

BACKGROUND

The present invention relates to methods and compositions for use in subterranean operations. More particularly, in certain embodiments, the present invention relates to methods of altering the viscosity of a subterranean treatment fluid with a cyclodextrin modifier.

Treatment fluids may be used in a variety of subterranean operations, including, but not limited to, drilling operations, stimulation, sand-control, fluid-diversion treatments, and cementing operations. As used herein, the term "treatment," or "treating," refers to any subterranean operation that uses a fluid in conjunction with a desired function and/or for a desired purpose. The term "treatment," or "treating," does not imply any particular action by the fluid or any particular component thereof.

Polymeric gelling agents, such as guar gums, cellulose derivatives, biopolymers, polysaccharides, synthetic polymers, and the like, have previously been added to treatment fluids to obtain a desired viscosity. Viscoelastic surfactants have also been added to treatment fluids to increase the viscosity thereof. For example, gels can be formed by the association of hydrophobic portions of surfactants to form micelles or larger associative structures. The micelles or other associative structures increase the viscosity of the base fluid and may provide viscoelastic characteristics to the fluid in cases where the surfactant structure is suitably chosen. Similarly, hydrophobically modified ("HM") polymers have been utilized to increase the viscosity of aqueous treatment fluids. As used herein, the term water-soluble relative permeability modifier. As used herein, the term "HM polymer" refers to a polymer with hydrophobic groups incorporated into a hydrophilic polymer structure while retaining water solubility. As used herein, a polymer is considered water soluble with at least 0.01 weight percent soluble in distilled water and, preferably, at least 5-10 weight percent soluble in distilled water. For instance, intermolecular associative micellar bonds may be formed between hydrophobic groups on a different polymer chain, which result in a three-dimensional associated network, akin to a cross-linked network structure, that thereby increases the viscosity of the fluids. Surfactants may be used to promote the formation of these micellar bonds among HM polymer chains. As used herein, the terms "micellar associations" and "micellar bonds" refer to those associative interactions between hydrophobic groups on HM polymers molecules.

Maintaining sufficient viscosity in these treatment fluids may be important for a number of reasons. For example, maintaining sufficient viscosity is important in fracturing and sand-control treatments for particulate transport and/or to create or enhance fracture width. Also, maintaining sufficient viscosity may be important to control and/or reduce fluid loss into the formation. Moreover, a treatment fluid of a sufficient viscosity may be used to divert the flow of fluids present within a subterranean formation (e.g., formation fluids, other treatment fluids) to other portions of the formation, for example, by "plugging" an open space within the formation. At the same time, while maintaining sufficient viscosity of the treatment fluid often is desirable, it also may be desirable to maintain the viscosity of the treatment fluid in such a way that the viscosity may be reduced at a particular time, inter alia, for subsequent recovery of the fluid from the formation.

SUMMARY

The present invention relates to methods and compositions for use in subterranean operations. More particularly, in certain embodiments, the present invention relates to methods of altering the viscosity and/or foaming characteristics of a subterranean treatment fluid with a cyclodextrin modifier. As used herein, the term "cyclodextrin modifier" generally refers to cyclodextrin, cyclodextrin derivatives, cyclodextrin dimers, cyclodextrin trimers, polymerized cyclodextrin, and combinations thereof that are capable of modifying the viscosity of a treatment fluid.

In one embodiment, the present invention provides a method comprising introducing a cyclodextrin modifier into a well bore penetrating a subterranean formation.

In another embodiment, the present invention provides a method of reducing viscosity of a treatment fluid comprising contacting a treatment fluid comprising a base fluid and a viscosifying agent with at least a cyclodextrin modifier wherein the viscosity of the treatment fluid is reduced.

In another embodiment, the present invention provides a method of increasing viscosity of an aqueous fluid comprising contacting at least a hydrophobically modified polymer and a cyclodextrin modifier in the presence of at least the aqueous fluid, wherein the viscosity of the aqueous fluid is increased.

In another embodiment, the present invention provides a subterranean treatment fluid comprising a base fluid and a cyclodextrin modifier.

The features and advantages of the present invention will be readily apparent to those skilled in the art. While numerous changes may be made by those skilled in the art, such changes are within the spirit of the invention.

BRIEF DESCRIPTION OF THE DRAWINGS

These drawings illustrate certain aspects of some of the embodiments of the present invention, and should not be used to limit or define the invention.

DESCRIPTION OF PREFERRED EMBODIMENTS

The present invention relates to methods and compositions for use in subterranean operations. More particularly, in certain embodiments, the present invention relates to methods of altering the viscosity and/or foaming characteristics of a subterranean treatment fluid with a cyclodextrin modifier.

There may be several potential advantages to the methods and compositions of the present invention. In accordance with embodiments of the present invention, a cyclodextrin modifier may be used to modify the viscosity of a treatment fluid. In one embodiment, a cyclodextrin modifier may contact a treatment fluid comprising a viscosifying agent, which may include, inter alia, a viscoelastic surfactant, a combination of a surfactant and a HM polymer, and/or a phosphonate surfactant, to decrease the viscosity of the treatment fluid. In other embodiments, a cyclodextrin modifier may contact a treatment fluid comprising a viscosifying agent, which may include a HM polyampholyte, to increase the viscosity of the treatment fluid.

I. Example Cyclodextrin Modifiers

Figure 1:
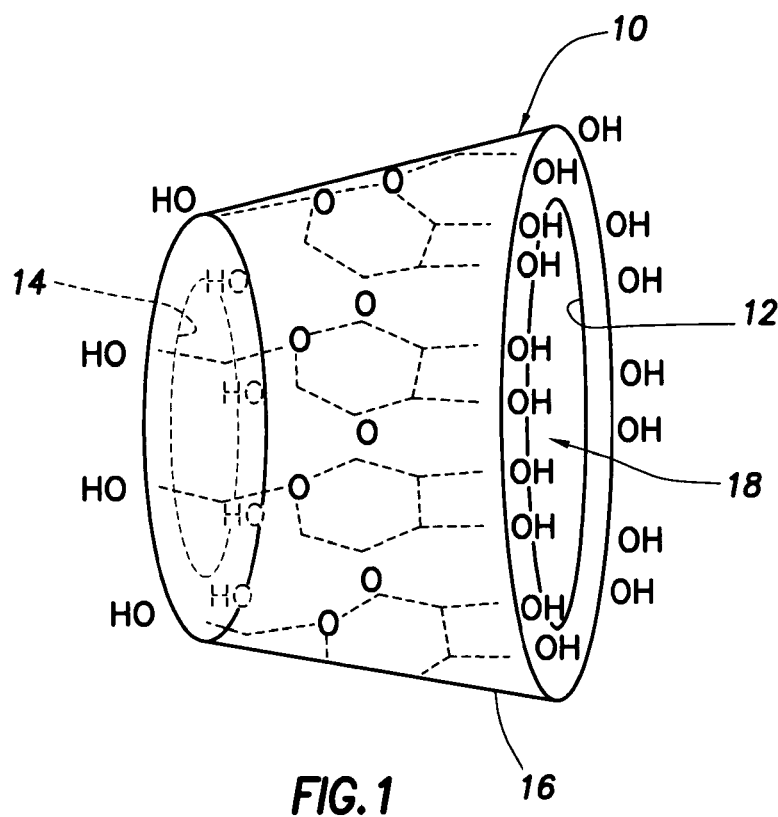
FIG. 1 illustrates the toroidal shape of $\gamma$-cyclodextrin.

One example of a suitable cyclodextrin modifier includes cyclodextrin. Generally, cyclodextrin is thought to be a cyclic oligosaccharide comprising at least 6 glucopyranose units joined by $\alpha$-(1,4) glycosidic linkages. While cyclodextrins may have up to 150 or more glucopyranose units, the more common cyclodextrins comprise 6, 7, or 8 ($\alpha$, $\beta$, and $\gamma$, respectively) glucopyranose units joined by $\alpha$-(1,4) glycosidic linkages. As illustrated by FIG. 1, cyclodextrins comprising 6-8 glucopyranose units can be represented as toroids. In the illustrated embodiment, $\gamma$-cyclodextrin is represented as toroid 10 with larger opening 12 and smaller opening 14 of toroid 10 representing secondary and primary hydroxyl groups, respectively. In general, the exterior 16 of toroid 10 should be sufficiently hydrophilic for the cyclodextrin to possess some water solubility. Internal cavity 18 of toroid 10 is generally apolar or relatively more hydrophobic and less hydrophilic than the exterior of the molecule and, thus, should be attractive to hydrophobic or lipophilic molecules. For example, the internal cavity (such as internal cavity 18) should be capable of hosting a hydrophobic portion of a "guest" compound, such as a surfactant or HM polymers, to form an inclusion complex therewith. As used herein, the term "inclusion complex" generally refers to the complex formed with the cyclodextrin functioning as a "host" to a "guest" compound that is contained or bound, wholly or partially, within the internal cavity of the cyclodextrin. It is believed that this entrapment of the hydrophobic portion of a surfactant or HM polymers should deactivate properties associated with hydrophobic groups (portion), such as, for example, micelle formation, viscosification, shear thickening, etc. Accordingly, cyclodextrin may be used to modify the viscosity of a treatment fluid, for example.

Derivatives of cyclodextrins may also be suitable for use as the cyclodextrin modifiers in accordance with embodiments of the present invention. In general, cyclodextrin derivatives are also capable of forming inclusion complexes with a hydrophobic portion of a "guest" compound. A variety of different cyclodextrin derivatives may be prepared by introducing different functional groups into the cyclodextrin molecule by reaction with the primary hydroxyl groups and/or the secondary hydroxyl groups. Because the hydroxyl groups have different reactivity, derivatizing cyclodextrin may result in an amorphous mixture that includes numerous isomers of different substituted cyclodextrin derivatives. Examples of suitable cyclodextrin derivatives include, but are not limited to: (1) acylated cylodextrin containing acetyl, propionyl, butyryl, or other suitable acyl groups; (2) hydroxylated cyclodextrin containing hydroxyethyl, hydroxypropyl, or other suitable hydroxy-alkyl groups; (3) carboxylated cylcodextrin containing carboxymethyl, carboxyethyl, or other suitable carboxyalkyl groups, and (4) alkylated cyclodextrin containing methyl, ethyl, propyl, benzyl, or other suitable alkyl groups. Examples of some of these cyclodextrin derivatives include, but are not limited to, methyl cyclodextrins, hydroxyethyl cyclodextrins, hydroxypropyl cyclodextrins, 2-hydroxyethyl cyclodextrins, carboxymethyl cyclodextrins, and carboxyethyl cyclodextrins. In certain embodiments, cyclodextrin may have glucose or maltose attached to the cyclodextrin ring, such as glucosyl cyclodextrins and maltosyl cyclodextrins. Specific examples of suitable cyclodextrin derivatives, include, but are not limited to, glucosyl-$\alpha$-cyclodextrin, maltosyl-$\alpha$-cyclodextrin, glucosyl-$\beta$-cyclodextrin, maltosyl-$\beta$-cyclodextrins, methyl-$\beta$-cyclodextrin, 2-hydroxypropyl-$\beta$-cyclodextrin, hydroxyethlyl-$\beta$-cyclodextrin, and 2-hydroxypropyl-$\gamma$-cyclodextrin. Combinations of the above-described cyclodextrins may also be suitable. Suitable cyclodextrins are available from CTD, Inc., High Springs, Fla.

Oligomerized cyclodextrins (such as cyclodextrin dimers and cyclodextrin trimers) and polymerized cyclodextrins are also suitable for use as cyclodextrin modifiers in accordance with embodiments of the present invention. In general, these oligomerized and polymeric cyclodextrin modifiers should also capable of forming inclusion complexes with a hydrophobic portion of a "guest" compound. Without being limited by theory, it is believed that oligomerized and polymerized cyclodextrins generally should be suitable for viscosification of HM polymers. In addition, it is believed that oligomerized and polymerized cyclodextrins generally should also be suitable for decreasing the viscosity of treatment fluids viscosified with a viscoelastic surfactant. Cyclodextrin dimers generally include two cyclodextrin molecules covalently coupled or crosslinked together for cooperative complexing with a "guest" compound. Cyclodextrin trimers generally include three cyclodextrin molecules covalently coupled or crosslinked together for cooperative complexing with a "guest" compound. Polymerized cyclodextrins generally include a unit of 10 or more cyclodextrin molecules covalently coupled or crosslinked together for cooperative complexing with a "guest" compound. Examples of suitable oligomerized and/or polymerized cyclodextrins include, but are not limited to, those containing carboxymethyl cyclodextrins, glucosyl cyclodextrins, maltosyl cyclodextrins, hydroxypropyl cyclodextrins, and 2-hydroxypropyl cyclodextrins.

II. Example Methods of Viscosity Reduction

As previously mentioned, a cyclodextrin modifier may be utilized to effect a viscosity decrease in a treatment fluid, in accordance with embodiments of the present invention. By way of example, a treatment fluid comprising a base fluid and a viscosifying agent may be contacted with a cyclodextrin modifier, wherein the viscosity of the treatment fluid is reduced. Without being limited by theory, it is believed that the cyclodextrin modifier interacts with the viscosifying agent to reduce the viscosity of the treatment fluid. It is further believed, for example, that the cyclodextrin modifier hosts a hydrophobic portion of the viscosifying agent to form an inclusion complex therewith, deactivating properties of the viscosifying agent associated with hydrophobic associations, such as viscosification. By reducing the viscosity of the treatment fluid, the cyclodextrin modifier may function similar to breakers commonly used, e.g., in fracturing, however, without breaking a long-chain molecule into shorter segments.

In general, the treatment fluids that may have their viscosity decreased by contact with a cyclodextrin modifier may comprise a base fluid and a viscosifying agent. The treatment fluid generally may include any of a variety of treatment fluids in which it may be desirable to facilitate a reduction in viscosity, including HM polymer gels, viscoelastic surfactant gels, and oil gels. Examples of suitable treatment fluids include, but are not limited to, stimulation fluids (e.g., fracturing fluids, acidizing fluids, etc.), drilling fluids, completion fluids, and the like. Additional additives may be included in the treatment fluids as desired for a particular application, including, but not limited to, gel stabilizers, fluid-loss-control additives, clay stabilizers, bactericides, proppant particulates, gravel particulates, pH-adjusting agents, pH buffers, combinations thereof, and the like. For example, proppant particulates may be included in a fracturing fluid and may deposited in fractures to prevent the fractures from closing so that conductive channels may be formed through which produced hydrocarbons can readily flow.

Suitable base fluids include aqueous fluids and oleaginous fluids. Examples of suitable aqueous fluids include, but are not limited to, freshwater, seawater, saltwater (water comprising a dissolved salt), and brines. Where present, the oleaginous fluid may be from natural or synthetic sources. Examples of suitable oleaginous fluids include, but are not limited to, α-olefins, internal olefins, alkanes, aromatic solvents, cycloalkanes, liquefied petroleum gas, kerosene, diesel oils, crude oils, gas oils, fuel oils, paraffin oils, mineral oils, low-toxicity mineral oils, olefins, esters, amides, synthetic oils (e.g., polyolefins), polydiorganosiloxanes, siloxanes, organosiloxanes, ethers, acetals, dialkylcarbonates, hydrocarbons, and combinations thereof.

Suitable viscosifying agents include viscosifying agents capable of increasing the viscosity of the treatment fluid through hydrophobic interactions. The increased viscosity of the treatment fluid may, for example, reduce fluid loss and allow transport of significant quantities of suspended particulates (e.g., gravel or proppant particulates). Examples of suitable viscosifying agents include, but are not limited to, viscoelastic surfactants, HM polymers, phosphonate surfactants, and combinations thereof. In general, the viscosifying agent may be included in the treatment fluid in an amount sufficient to provide the desired viscosity. For example, the viscosifying agent may be present in an amount of 0.01% to about 15% by weight of the treatment fluid and, alternatively, in an amount of 0.1% to about 10% by weight of the treatment fluid.

A viscoelastic surfactant may increase the viscosity of the treatment fluid, for example, by association of hydrophobic portions of the surfactants to form micelles of specialized or larger associative structures, for example worm-like structures. In certain embodiments, the viscoelastic surfactant is used in a treatment fluid with an aqueous base fluid. Example of suitable viscoelastic surfactants, include, but are not limited to: anionic VES surfactants such as alkyl sarcosinate; cationic surfactants such as fatty amine salts or N-erucyl-M, N-bis(2-hydroxyethyl)-N-methyl ammonium chloride; zwitterionic surfactants such as erucylamidopropyl betaine amine; non-ionic surfactants such as amidoamine oxides, amine oxides; and combinations thereof. Because micelle formation may be dependent on a number of factors, including pH of the treatment fluid, the treatment fluid may contain additional additives, such as pH buffers and/or pH-adjusting agents. Where the viscosifying agent comprises a viscoelastic surfactant, the base fluid generally comprises an aqueous fluid. In certain embodiments, a viscoelastic surfactant may be used in combination with a HM polymer.

Figure 2:
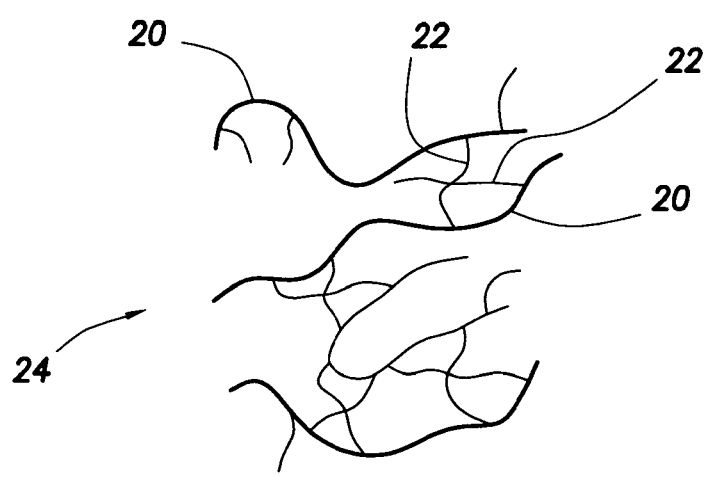
FIG. 2 illustrates hydrophobic associations between HM polymers, in accordance with embodiments of the present invention.
Figure 3:
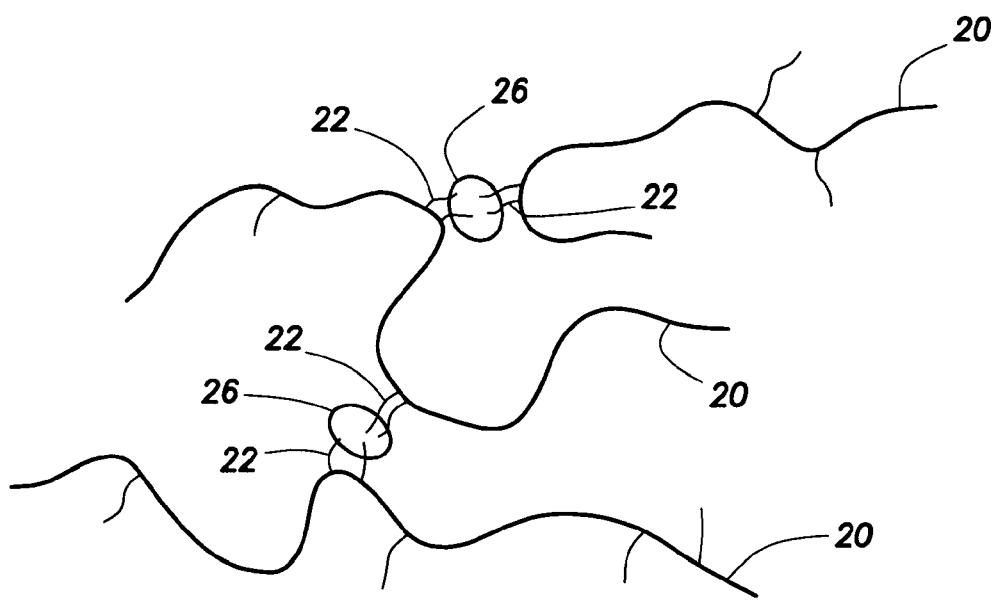
FIG. 3 illustrates use of a surfactant to promote hydrophobic associations between HM polymers, in accordance with embodiments of the present invention.

HM polymers also may be used to increase the viscosity of the treatment fluid. As illustrated by FIG. 2, the HM polymers 20 may increase the viscosity, for example, by associative interactions between hydrophobic groups 22 of the HM polymers 20 to form intermolecular micellar bonds, which result in a three-dimensional network 24. In addition, surfactants may be used to facilitate the formation of these micellar bonds. It is believed that the hydrophobic groups 22 of the HM polymers 24 may become incorporated into surfactant micelles 26, which act as crosslinkers, as illustrated by FIG. 3. These surfactants may show newtonian or viscoelastic behavior when present in water by themselves in concentrations of less than 20%. In certain embodiments, the HM polymer is used in a treatment fluid with an aqueous base fluid.

While the HM polymers generally have hydrophobic groups incorporated into the hydrophilic polymer structure, the HM polymer should remain water soluble. In certain embodiments, the HM polymer comprises a hydrophilic polymer backbone and alkyl branch of 4 to 22 carbons (e.g., 6 carbons, 8 carbons, 10 carbons, 12 carbons, 14 carbons, 16 carbons, 18 carbons, 20 carbons). In certain embodiments, the HM polymer may comprise a HM polyelectrolyte containing only one type of charge, for example, a HM anionic or HM cationic polymer. Examples of suitable HM polymers include, but are not limited to, HM polysaccharides and derivatives thereof that contain one or more of these monosaccharide units: galactose; mannose; glucoside; glucose; xylose; arabinose; fructose; glucuronic acid; or pyranosyl sulfate. Examples of suitable HM polysaccharides include, but are not limited to, HM guar gum and derivatives thereof, such as HM hydroxypropyl guar and HM carboxymethylhydroxypropyl guar, and HM cellulose derivatives, such as HM hydroxyethyl cellulose and HM carboxymethyl cellulose. Additionally, synthetic HM polymers and HM copolymers that contain the above-mentioned functional groups may be used. Examples of such synthetic polymers include, but are not limited to, HM polyacrylate, HM polymethacrylate, HM polyacrylamide, HM polyvinyl alcohol, and HM polyvinylpyrrolidone. Combinations of HM polymers may also be suitable. An example of a suitable HM hydroxyethyl cellulose is available as Natrasol Plus® or Natrasol Plus® 330 from Hercules Inc., Wilmington, Del.

As previously mentioned, a surfactant may be used to facilitate viscosification of a fluid (such as the base fluid in the treatment fluid) with a HM polymer. In certain embodiments, the surfactant may be a non-viscoelastic surfactant. Suitable surfactants capable of functioning as crosslinkers for HM polymers may be anionic, neutral, cationic or zwitterionic. Aqueous liquids containing the surfactants may respond to shear with a newtonian or viscoelastic behavior. Anionic surfactants with Newtonian rheological behavior are preferred. Examples of suitable anionic surfactants include, but are not limited to, sodium decylsulfate, sodium lauryl sulfate, alpha olefin sulfonate, alkylether sulfates, alkyl phosphonates, alkane sulfonates, fatty acid salts, arylsulfonic acid salts, and combinations thereof. Examples of suitable cationic surfactants, include, but are not limited to, trimethylcocoammonium chloride, trimethyltallowammonium chloride, dimethyldicocoammonium chloride, bis(2-hydroxyethyl)tallow amine, bis(2-hydroxyethyl)erucylamine, bis(2-hydroxyethyl)coco-amine, cetylpyridinium chloride, and combinations thereof. Where used, the surfactant may be included in the treatment fluid in an amount of about 0.1% to about 20% by weight of the treatment fluid (e.g., 2%, 4%, 6%, 8%, 10%, 12%, 14%, 16%, or 18%).

A phosphonate surfactant may be used to viscosify a treatment fluid comprising an oleaginous base fluid, for example, by association of the hydrophobic portions of the phosphonate surfactant. In general, a phosphonate surfactant comprises a C—PO(OH)$_2$ or C—PO(OR)$_2$ group, wherein R is an alkyl or aryl group. Examples of suitable phosphonate surfactants include, but are not limited to octylphosphonic acid monomethyl ester monomethyl ester and combinations thereof. Examples of suitable phosphonate surfactants are described in U.S. Pat. No. 6,511,944 and No. 6,544,934, the disclosure of which are incorporated herein by reference.

Figure 4:
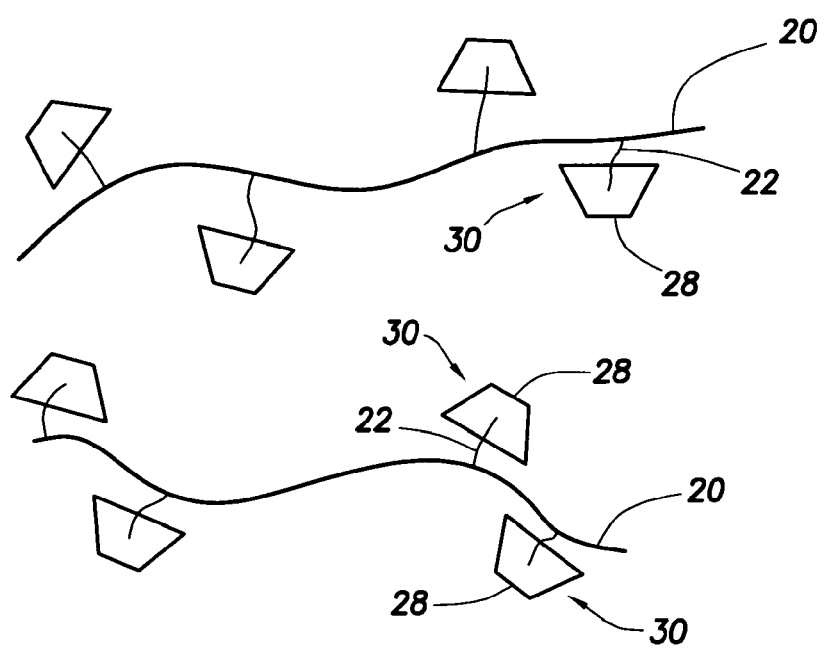
FIG. 4 illustrates complexing of a cyclodextrin modifier with HM polymers, in accordance with embodiments of the present invention.

As previously discussed, the suitable viscosifying agents generally may increase the viscosity of the treatment fluid through hydrophobic interactions. For example, hydrophobic portions of the viscoelastic surfactant may associate to form micelles or larger associative structures, while hydrophobic portions of the HM polymer may associate to form what are considered micellar bonds, resulting in a three-dimensional network. In accordance with embodiments of the present invention, these treatment fluids may be contacted by a cyclodextrin modifier. As previously mentioned, the cyclodextrin modifier includes an internal cavity (such as internal cavity 18 on FIG. 1) that is capable of hosting a hydrophobic portion of a "guest" compound, such as the viscosifying agent, to form an inclusion complex therewith. As illustrated by FIG. 4, the cyclodextrin modifiers 28 should host the hydrophobic groups 22 of the HM polymers 20, forming inclusion complexes 30 therewith. It is believed that this entrapment of the hydrophobic portion of the viscosifying agent should deactivate properties associated with hydrophobic associations that increase the viscosity of the fluid. Accordingly, the cyclodextrin modifier may be used to decrease the viscosity of the treatment fluid.

These viscosity-reduction methods may be initiated by contacting the treatment fluid with at least the cyclodextrin modifier, in accordance with embodiments of the present invention. Suitable modifiers for the purpose of viscosity reduction are non-polymeric. To decrease the viscosity of the treatment fluid, the cyclodextrin modifier may be added to the treatment fluid, for example, in an amount in the range of 0.01% to about 30% by weight of the treatment fluid (e.g., 0.05%, 0.1%, 0.5%, 1%, 2%, 3%, 4%, 5%, 6%) and, alternatively, in the range of 1.0% to about 20% by weight of the treatment fluid. In general, the maximum amount of the cyclodextrin modifier that may be used to decrease viscosity may be equivalent to moles of hydrophobic groups present in the viscosifying agent. However, a particular amount of the cyclodextrin modifier may be the amount determined in the laboratory required to obtain maximum reduction in viscosity of the treatment fluid measured at the temperature. In certain embodiments, the cyclodextrin modifier may contact the treatment fluid subsequent to the introduction of the treatment into a well bore. For example, the treatment fluid may be introduced into a subterranean formation at or above a pressure sufficient to create or enhance one or more fractures in the subterranean formation. After introduction of the treatment fluid into the subterranean formation, it may be desirable to reduce the viscosity of the treatment fluid so that it may be recovered from the formation and/or proppant particulates may be deposited in the formation. Accordingly, a fluid comprising the cyclodextrin modifier may then be introduced into the well bore such that the cyclodextrin modifier contacts the treatment fluid. As previously mentioned, the cyclodextrin modifier should then interact with the viscosifying agent to decrease viscosity of the treatment. In certain embodiments, a spacer fluid may be introduced into the well bore between the treatment fluid comprising the viscosifying agent and the fluid comprising the cyclodextrin modifier. In certain embodiments, the cyclodextrin modifier may have been introduced into the well bore prior to the treatment fluid. In these embodiments, the treatment fluid should contact the cyclodextrin modifier after its introduction into the well bore. For example, after introduction of the treatment fluid, the well bore may be placed on drawdown to recover the treatment fluid. When the well bore is placed on drawdown, the cyclodextrin modifier that has preceded the treatment fluid should flow back to the well bore contacting the treatment fluid in the well bore.

III. Example Methods of Viscosification

In addition, cyclodextrin may be utilized to effect a viscosity increase in a treatment fluid, in accordance with embodiments of the present invention. For example, a treatment fluid comprising a base fluid and a HM polymer may be contacted with a cyclodextrin modifier, wherein the viscosity of the treatment fluid is increased. Without being limited by theory, it is believed that the cyclodextrin modifier interacts with the HM polymer to viscosify the treatment fluid. In certain embodiments, viscosification may be accomplished using polymeric cyclodextrins and HM polymers. In certain embodiments, viscosification may be accomplished using a cyclodextrin modifier and a HM polyampholyte. As used herein, the term "polyampholyte" refers to a polymer molecule containing both anionic and cationic groups in the polymer chain. Without being limited by theory, it is believed that the monomeric and oligomeric cyclodextrin modifiers viscosify by deactivating intramolecular and intermolecular associative bonding in the polymer by hosting the hydrophobic groups and thus allowing ionic associations among oppositely charged ionic groups present on different polymer chains. It is also believed, without being limited by theory, that deactivation of intramolecular hydrophobic associative bonds allows for uncoiling of the polymer chains and increasing the degree of intermolecular ionic bonding. Use of polymeric cyclodextrin modifiers would provide for additional crossing owing to the crosslinking of the HM polymer chains by cyclodextrin groups in the polymeric cyclodextrin hosting the hydrophobic chains on the HM polymer. When polymeric cyclodextrin modifiers are used for viscosification, the HM polymers need not contain oppositely charged ionic groups and may be non-ionic or may contain either anionic, cationic or zwitterionic groups.

In certain embodiments, the treatment fluids that may have their viscosity increased by contact with a cyclodextrin modifier may comprise an aqueous fluid and a HM polyampholyte. Examples of suitable aqueous fluids include, but are not limited to, freshwater, seawater, saltwater (water comprising a dissolved salt), and brines. The treatment fluid generally may include any of a variety of treatment fluids in which it may be desirable to facilitate an increase in viscosity. Examples of suitable treatment fluids include, but are not limited to, stimulation fluids (e.g., fracturing fluids, acidizing fluids, etc.), drilling fluids, completion fluids, conformance gels, relative-permeability modifiers, gravel-pack fluids and the like. Additional additives may be included in the treatment fluids as desired for a particular application, including, but not limited to, gel stabilizers, fluid-loss-control additives, clay stabilizers, bactericides, proppant particulates, gravel particulates, pH-adjusting agents, pH buffers, combinations thereof, and the like. For example, proppant particulates may be included in a fracturing fluid and may be deposited in fractures to prevent the fractures from closing so that conductive channels may be formed through which produced hydrocarbons can readily flow. By way of another example, a drilling fluid carrying a drill cuttings and circulated to the surface subsequent to drilling may be made to release the cuttings by reducing the viscosity of the fluid by the addition of a cyclodextrin modifier to the fluid.

In general, the HM polyampholyte may be included in the treatment fluid in an amount sufficient for a particular application. For example, the HM polyampholyte may be present in an amount of 0.02% to about 10% by weight of the treatment fluid (e.g., 0.05%, 0.1%, 0.5%, 1%, 2%, 3%, 4%, 5%, 6%, 7%, 8%, or 9%).

While the HM polyampholyte generally has hydrophobic groups incorporated into the hydrophilic polymer structure, the HM polyampholyte should remain water soluble. In certain embodiments, the HM polyampholyte comprises a hydrophilic polymer backbone and an alkyl branch of 4 to 22 carbons (e.g., 6 carbons, 7 carbons, 8 carbons, 10 carbons, 12 carbons, 14 carbons, 16 carbons, 18 carbons, 20 carbons). Examples of suitable HM polyampholytes include, but are not limited to, HM cationic partially hydrolyzed polyacrylamides, HM poly(vinylamines/acrylic acid), HM alkyl acrylate polymers with pendant amine groups in general, and combinations thereof. The anionic groups in these HM polyampholyte may be due, for example, to partial hydrolysis of the acrylate groups. Additional examples of HM alkyl acrylate polymers include, but are not limited to, HM polydimethylaminoethyl methacrylate, polydimethylaminopropyl methacrylamide, HM poly(acrylamide/dimethylaminoethyl methacrylate), HM poly(methacrylic acid/dimethylaminoethyl methacrylate), HM poly(2-acrylamido-2-methyl propane sulfonic acid/dimethylaminoethyl methacrylate), HM poly(acrylamide/dimethylaminopropyl methacrylamide), HM poly (acrylic acid/dimethylaminopropyl methacrylamide), HM poly(methacrylic acid/dimethylaminopropyl methacrylamide), and combinations thereof. In certain embodiments, the HM polyampholyte comprises a polymer that has been hydrophobically modified with an alkyl group present on an amino group (in the polymer backbone or as a pendant group) in quaternized form. For example, an alkyl group may be present on a dialkyl amino pendant group in quaternized form. In one embodiment, the dialkyl amino pendant group comprises a dimethyl amino pendant group. Specific examples of suitable HM polyampholytes include, but are not limited to a polydimethylaminoethylmethacrylate or polydimethylaminopropylmethacrylamide that has been hydrophobically modified with an alkyl group with 14 carbons to 22 carbons (e.g., 16 carbons, 18 carbons, 20 carbons) on a dimethylamino group. An example of a suitable HM polyampholyte is HPT-1™ relative permeability modifying polymer available from Halliburton Energy Services, Inc., Duncan, Okla.

As previously discussed, the HM polyampholyte present in the treatment fluid may interact with the cyclodextrin modifier to increase the viscosity of the treatment fluid. In addition, the polyampholyte may also function as a relative permeability modifier. As used herein, the term "relative permeability modifier" refers to a polymer that selectively reduces the effective permeability of a subterranean formation to water. It is believed that the HM polyampholyte may attach to surfaces within the subterranean formation, reducing the formation's effective permeability to water without a comparable reduction in its permeability to hydrocarbons As previously mentioned, viscosification of treatment fluids using cyclodextrin modifiers can also be accomplished by the use of polymeric cyclodextrins and HM polymers. For example, a treatment fluid comprising a base fluid and a HM polymer may be contacted with a polymeric cyclodextrin, wherein the polymeric cyclodextrin interacts with the HM polymer to viscosify the treatment fluid. In these embodiments, the HM polymer need not be a HM polyampholyte. For example, the HM polymers may be non-ionic, anionic, or cationic or may contain zwitterionic groups. Examples of suitable HM polymers suitable for use in combination with polymeric cyclodextrin modifiers are described above in Section, but may be used in certain embodiments without the surfactants.

These viscosification methods may be initiated by contacting the treatment fluid with at least one cyclodextrin modifier, in accordance with embodiments of the present invention. To increase the viscosity of the treatment fluid, the cyclodextrin modifier may be added to the treatment fluid, for example, in an amount in the range of 0.01% to about 10% by weight of the treatment fluid (e.g., 0.05%, 0.1%, 0.5%, 1%, 2%, 3%, 4%, 5%, 6%) and, alternatively, in the range of 0.01% to about 5% by weight of the treatment fluid. For example, a sufficient concentration of the cyclodextrin modifier may be included in the treatment to deactivate substantially all of the hydrophobic groups in the polymer. In certain embodiments, the cyclodextrin modifier may contact the treatment fluid prior to its introduction into a well bore. For example, the cyclodextrin modifier may be included in the treatment fluid during its preparation and, thereafter, the treatment fluid may be introduced into the well bore. For example, a treatment fluid comprising a base fluid, a HM polymer, and a cyclodextrin modifier may be introduced into the well bore. As previously mentioned, the HM polymer and the cyclodextrin modifier may interact to increase the viscosity of the treatment fluid. In certain embodiments, the treatment fluid may be introduced into a subterranean formation at or above a pressure sufficient to create or enhance one or more fractures in the subterranean formation.

In certain embodiments, the cyclodextrin modifier may contact a HM polyampholyte subsequent to its introduction into the subterranean formation. For example, the treatment fluid comprising the aqueous fluid and the HM polyampholyte may be introduced into a subterranean formation. In certain embodiments, the treatment fluid may be bullheaded into the formation, in that the treatment fluid is introduced into the subterranean formation without isolation of the treated portion of the formation. Those of ordinary skill in the art, with the benefit of this disclosure, will appreciate that the HM polymer may be introduced into a portion of the subterranean formation to reduce its effective permeability to water. In certain embodiments, water production from the subterranean formation may be monitored. To facilitate viscosification, the HM polymer present in the subterranean formation may be contacted with a cyclodextrin modifier in the presence of an aqueous fluid, wherein the HM polymer and the cyclodextrin modifier interact to increase the viscosity of the aqueous fluid inside the formation. Advantageously, sequential introduction of the treatment fluid comprising the HM polymer and the cyclodextrin modifier may allow placement of a plugging gel in the formation without the need for isolation of the treated portion of the formation. The production of water from this portion of the formation may be further reduced by this in situ viscosification that results, for example, in formation of a plugging gel. In certain embodiments, the viscosified aqueous fluid may be used for the diversion of aqueous fluids that are subsequently introduced into the well bore in a variety of subterranean operations, such as in acid-stimulation operations, injection operations, scale-inhibition operations, and clay-stabilization operations.

To facilitate a better understanding of the present invention, the following examples of certain aspects of some embodiments are given. In no way should the following examples be read to limit, or define, the entire scope of the invention.

EXAMPLE 1

The following series of tests were performed to determine the effect of a cyclodextrin modifier on a fluid viscosified with a HM polymer and/or a surfactant. To prepare viscous fluids, samples were prepared by mixing HM hydroxyethyl cellulose with an aqueous fluid. The HM hydroxyethyl cellulose utilized in this example was Natrasol Plus® hydroxyethyl cellulose ("HEC"), available from Hercules, Inc. Further, the aqueous fluid used was tap water unless otherwise indicated. In certain samples, a surfactant (sodium dodecylsulfate) was also added to the aqueous fluid. After preparation, the viscosity of each sample was determined using a Brookfield viscometer at 12 rpm using a #2 or #3 spindle. The determined viscosities for each sample are listed below in Table 1. The concentrations of the components shown in the table below are percent by weight of the aqueous fluid.

TABLE 1

| Sample | Viscosity (cP) |
| --- | --- |
| 2% HM hydroxyethyl cellulose | 3,800 |
| 1% HM hydroxyethyl cellulose | 270 |
| 0.5% HM hydroxyethyl cellulose | 20 |
| 1% HM hydroxyethyl cellulose + 0.0033% sodium dodecylsulfate | 725 |
| 1% HM hydroxyethyl cellulose + 0.0283% sodium dodecylsulfate | 1,150 |
| 1% HM hydroxyethyl cellulose + 0.283% sodium dodecylsulfate | 23,500 (lipping gel) |

As illustrated by Table 1, an aqueous fluid may be viscosified using HM hydroxyethyl cellulose, either alone or in combination with a surfactant. As discussed previously, a cyclodextrin modifier may be used to complex with a HM polymer, such as HM hydroxethyl cellulose, resulting in a fluid with reduced viscosity.

To demonstrate viscosity reduction with a cyclodextrin modifier of fluids viscosified with a HM polymer and a surfactant, samples were prepared by adding hydroxypropyl-β-cyclodextrin at different concentrations to a fluid containing 1% HM hydroxyethyl cellulose (Natrasol Plus® hydroxyethyl cellulose) and sodium dodecylsulfate. In one sample, sodium dodecylsulfate and hydroxypropyl-β-cyclodextrin were added to a fluid containing 1% HM hydroxyethyl cellulose. After preparation, the viscosity of each sample was determined using a Brookfield viscometer at 12 rpm using a #2 or #3 spindle. The determined viscosities for each sample are listed below in Table 2. The concentrations of the components shown in the table below are percent by weight of the aqueous fluid.

TABLE 2

| Sample | Viscosity (cP) |
| --- | --- |
| 1% HM hydroxyethyl cellulose + 0.0283% sodium dodecylsulfate | 1,400 |
| 1% HM hydroxyethyl cellulose + 0.0283% sodium dodecylsulfate + 0.095% hydroxypropyl-β-cyclodextrin | 700 |
| 1% HM hydroxyethyl cellulose + 0.0283% sodium dodecylsulfate + 0.2% hydroxypropyl-β-cyclodextrin | 410 |
| 1% HM hydroxyethyl cellulose + | 620 |

TABLE 2-continued

| Sample | Viscosity (cP) |
| --- | --- |
| mixture of 0.0283% sodium dodecylsulfate and 0.2% hydroxypropyl-β-cyclodextrin | |

Accordingly, Table 2 demonstrates that the addition of a cyclodextrin modifier, such as hydroxypropyl-β-cyclodextrin, to a viscosified fluid of a surfactant and a HM polymer results in a viscosity decrease.

Figure 5:
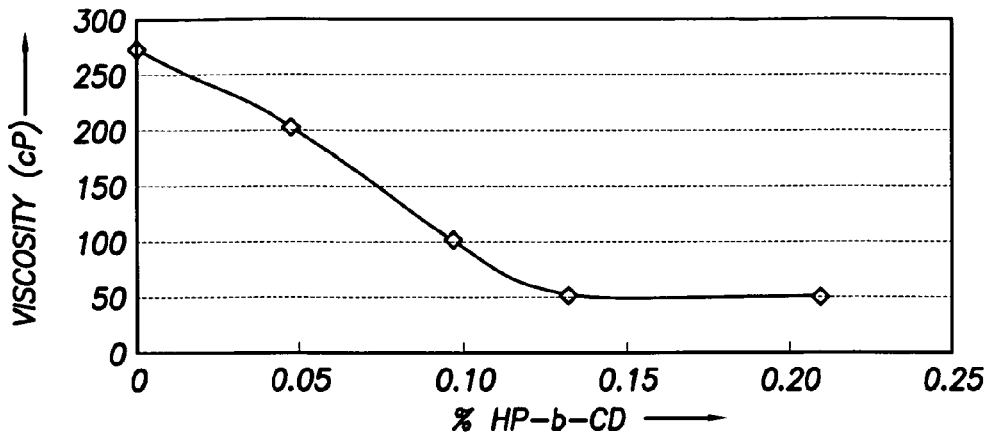
FIG. 5 is a graph of viscosity versus concentration of hydroxypropyl-$\beta$-cyclodextrin for sample fluids comprising a HM polymer and the hydroxypropyl-$\beta$-cyclodextrin.

To demonstrate viscosity reduction with a cyclodextrin modifier of fluids viscosified with a HM polymer, samples were prepared by adding hydroxypropyl-β-cyclodextrin at different concentrations to a fluid containing 1% HM hydroxyethyl cellulose (Natrasol Plus® hydroxyethyl cellulose). In certain sample, sodium dodecylsulfate was added to this mixture. After preparation, the viscosity of each sample was determined using a Brookfield viscometer at 12 rpm using a #2 or #3 spindle. The determined viscosities for each sample are listed below in Table 3. The concentrations of the components shown in the table below are percent by weight of the aqueous fluid. A chart of viscosity versus % hydroxypropyl-β-cyclodextrin is provided in FIG. 5.

TABLE 3

| Sample | Viscosity (cP) |
| --- | --- |
| 1% HM hydroxyethyl cellulose | 270 |
| 1% HM hydroxyethyl cellulose + 0.0467% hydroxypropyl-β-cyclodextrin | 200 |
| 1% HM hydroxyethyl cellulose + 0.0967% hydroxypropyl-β-cyclodextrin | 100 |
| 1% HM hydroxyethyl cellulose + 0.133% hydroxypropyl-β-cyclodextrin | 50 |
| 1% HM hydroxyethyl cellulose + 0.21% hydroxypropyl-β-cyclodextrin | 50 |
| Mixture of 1% HM hydroxyethyl cellulose and 0.133% hydroxypropyl-β-cyclodextrin + 0.033% sodium dodecylsulfate | 600 |
| Mixture of 1% HM hydroxyethyl cellulose and 0.133% hydroxypropyl-β-cyclodextrin + 0.083% sodium dodecylsulfate | 2,050 |

Accordingly, Table 3 and FIG. 3 demonstrate that the addition of a cyclodextrin modifier, such as hydroxypropyl-β-cyclodextrin, to a fluid viscosified with an HM polymer results in a viscosity decrease. In addition, Table 3 also demonstrates the fluid can be re-viscosified by addition of sodium dodecylsulfate. This suggests that the complex formed between the cyclodextrin modifier and the HM polymer disassociates due to stronger binding of the cyclodextrin modifier with the sodium dodecylsulfate.

Figure 6:
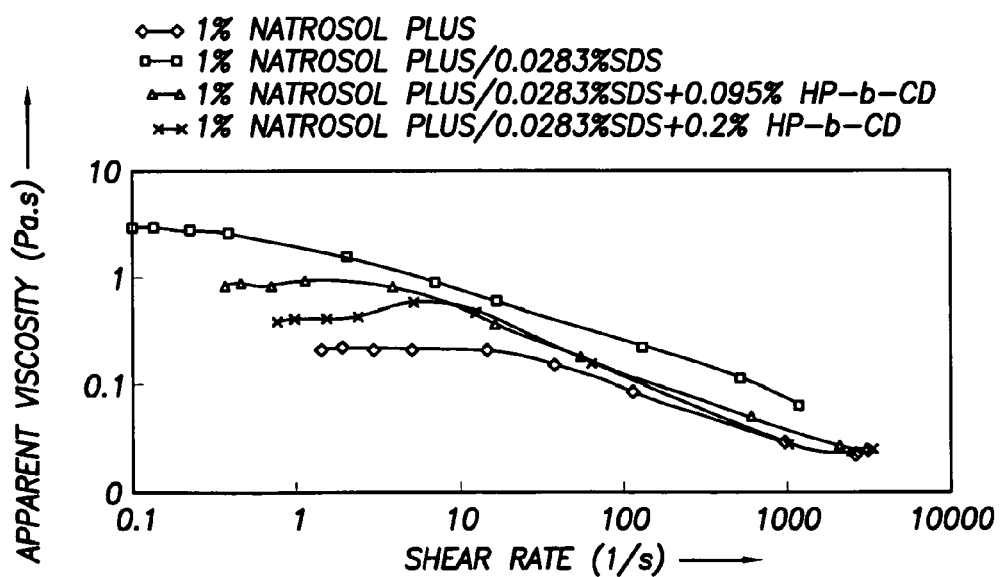
FIG. 6 is a graph of apparent viscosity versus shear rate for sample fluids comprising a HM polymer, a surfactant, and/or hydroxypropyl-$\beta$-cyclodextrin.

The rheological behavior of certain samples from this example was also evaluated. A chart of apparent viscosity versus shear rate for each sample is provided in FIG. 6. FIG. 6 demonstrates the effectiveness of hydroxypropyl-β-cyclodextrin in reducing viscosity in that the fluid with a higher level of hydroxypropyl-β-cyclodextrin has almost identical flow behavior as the fluid with only the HM polymer.

EXAMPLE 2

To demonstrate viscosity increase with a cyclodextrin modifier, a fluid was prepared by mixing a cyclodextrin modifier with a HM polyampholyte. The first sample was prepared by mixing 30 mg solid hydroxypropyl-β-cyclodextrin with 5.3 grams of a 0.5% by weight solution of a HM polyampholyte (HPT-1™ relative permeability modifying polymer from Halliburton Energy Services, Inc.). Upon shaking the test tube, the sample was observed to quickly form a non-flowable gel.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (of the form, "from about a to about b," or, equivalently, "from approximately a to b," or, equivalently, "from approximately a-b") disclosed herein is to be understood as referring to the power set (the set of all subsets) of the respective range of values, and set forth every range encompassed within the broader range of values. Moreover, the indefinite articles "a" or "an", as used in the claims, are defined herein to mean one or more than one of the element that it introduces. Also, the terms in the claims have their plain, ordinary meaning unless otherwise explicitly and clearly defined by the patentee.

What is claimed is:

1. A method comprising:
providing a cyclodextrin modifier comprising hydroxypropyl-β-cyclodextrin;
providing a treatment fluid that comprises a base fluid and a viscosifying agent;
wherein the viscosifying agent comprises a hydrophobically modified polymer and the viscosifying agent optionally further comprises, a viscoelastic surfactant, a phosphonate surfactant, or a combination thereof; and,
wherein the hydrophobically modified polymer comprises hydroxyethyl cellulose
introducing the cyclodextrin modifier and the treatment fluid into a well bore penetrating a subterranean formation wherein the viscosity of the treatment fluid is decreased due to the combination of the hydrophobically modified polymer and the cyclodextrin modifier, wherein the cyclodextrin modifier is present in an amount of about 1% to about 20% by weight of the treatment fluid; and wherein the viscosifying agent is present in amount of about 0.1% to about 10% by weight of the treatment fluid.

2. The method of claim 1 wherein the cyclodextrin modifier further comprises a methyl cyclodextrin, a hydroxyethyl cyclodextrin, a 2-hydroxyethyl cyclodextrin, a carboxymethyl cyclodextrin, a carboxyethyl cyclodextrin, a glucosyl cyclodextrin, a maltosyl cyclodextrin or a combination thereof.

3. The method of claim 2 wherein the cyclodextrin modifier, in addition to hydroxypropyl-β-cyclodextrin, is selected from the group consisting of glucosyl-α-cyclodextrin, maltosyl-α-cyclodextrin, glucosyl-β-cyclodextrin, maltosyl-α-cyclodextrins, methyl-α-cyclodextrin, 2 hydroxypropyl-β-cyclodextrin, hydroxyethyl-α-cyclodextrin, and 2-hydroxypropyl-γ-cyclodextrin.

4. The method of claim 1 wherein the viscosifying agent further comprises a material selected from the group consisting of a hydrophobically modified hydroxypropyl guar, a hydrophobically modified carboxymethylhydroxypropyl guar, a hydrophobically modified polymethacrylate, a hydrophobically modified polyacrylamide, a hydrophobically modified polyvinyl alcohol, a hydrophobically modified polyvinylpyrrolidone, and combinations thereof.

5. A method comprising:
providing a treatment fluid that comprises a base fluid and a viscosifying agent;
wherein the viscosifying agent comprises a hydrophobically modified polymer and the viscosifying agent optionally further comprises, a viscoelastic surfactant, a phosphonate surfactant, or a combination thereof; wherein the viscosifying agent is present in amount of about 0.1% to about 10% by weight of the treatment fluid and,
wherein the hydrophobically modified polymer comprises hydroxethyl cellulose
introducing the treatment fluid into a well bore penetrating a subterranean formation at a pressure sufficient to create or enhance at least one fracture in the subterranean formation;
introducing a cyclodextrin modifier composition comprising a cyclodextrin modifier into the portion of the subterranean formation such that the cyclodextrin modifier contacts the treatment fluid wherein the viscosity of the treatment fluid is decreased due to the combination of the hydrophobically modified polymer and the cyclodextrin modifier wherein the cyclodextrin modifier comprises hydroxyethylcellulose; and wherein the cyclodextrin modifier is present in an amount of about 1% to about 20% by weight of the composition.

6. The method of claim 5 wherein the cyclodextrin modifier further comprises a methyl cyclodextrin, a hydroxyethyl cyclodextrin, a 2-hydroxyethyl cyclodextrin, a carboxymethyl cyclodextrin, a carboxyethyl cyclodextrin, a glucosyl cyclodextrin, and a maltosyl cyclodextrin.

7. The method of claim 6 wherein the cyclodextrin modifier, in addition to hydroxypropyl-β-cyclodextrin, is selected from the group consisting of glucosyl-α-cyclodextrin, maltosyl-α-cyclodextrin, glucosyl-β-cyclodextrin, maltosyl-α-cyclodextrins, methyl-α-cyclodextrin, 2-hydroxypropyl-β-cyclodextrin, hydroxyethyl-α-cyclodextrin, and 2-hydroxypropyl-γ-cyclodextrin.

8. The method of claim 5 wherein the viscosifying agent further comprises a material selected from the group consisting of a hydrophobically modified hydroxypropyl guar, a hydrophobically modified carboxymethylhydroxypropyl guar, a hydrophobically modified polymethacrylate, a hydrophobically modified polyacrylamide, a hydrophobically modified polyvinyl alcohol, a hydrophobically modified polyvinylpyrrolidone, and combinations thereof.

9. The method of claim 5 wherein the cyclodextrin modifier is introduced to the subterranean formation before the treatment fluid is placed.

10. The method of claim 5 wherein the cyclodextrin modifier is introduced to the subterranean formation after the treatment fluid is placed.

* * * * *